Aug. 1, 1967  S. LISZCZAK  3,334,176
RETRACTILE CORD
Filed July 22, 1965
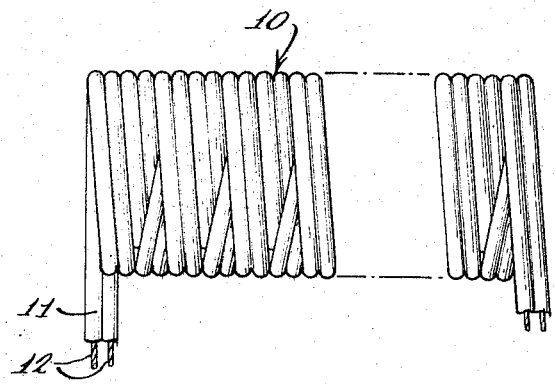
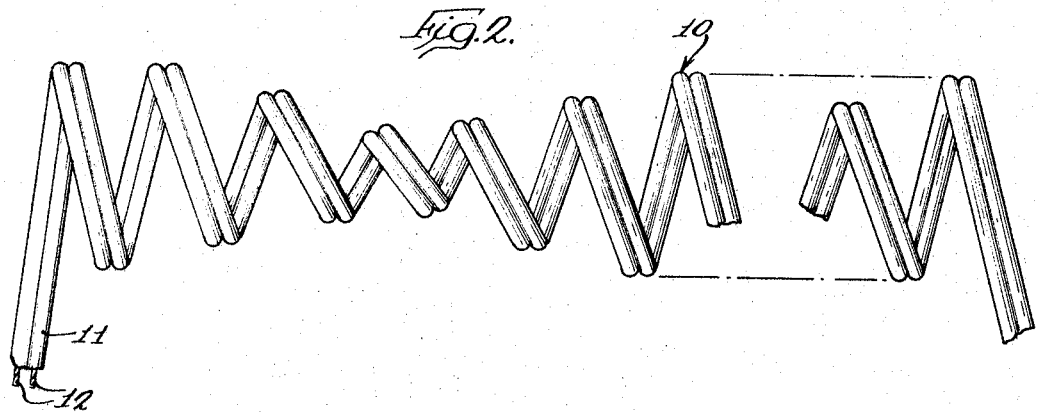
Inventor
Stephen Liszczak
By
George R. Clark
Atty

United States Patent Office 3,334,176
Patented Aug. 1, 1967

3,334,176
RETRACTILE CORD
Stephen Liszczak, Wood Dale, Ill., assignor to Sunbeam Corporation, Chicago, Ill., a corporation of Illinois
Filed July 22, 1965, Ser. No. 474,108
2 Claims. (Cl. 174—69)

This invention relates to retractile coiled cords and more particularly to improvements in very compact retractile electric power cords.

For some time, retractile helical cords have been used commercially in applications where it is desirable for an electric power cord to retract into a relatively short length and still be capable of extending to a relatively long length. This type of cord is used extensively with telephones. With the advent of a large number of electrical portable appliances used in the home, it was found desirable to provide a power cord which would retract toward the appliance when not attached to an electrical receptacle. In this manner, the appliance cord would not occupy valuable space on a kitchen counter and in addition the cord would not become entangled with other cords on the counter. In many cases, electrical appliances are provided with a cord storage chamber within the appliance housing so that the cord may be stored therein when not in use. While this approach is highly desirable for appliances having a relatively large housing, it has not been practical for small portable appliances such as an electric dry shaver or the like where the standard coiled cord would occupy too large a volume in the retracted state. In many instances, items such as electric shavers, are taken by people who are traveling and it is convenient to have the power cord storaged within the small shaver housing while at the same time providing a relatively long cord which is required for proper use of the appliance. Thus, there is a need for a retractile cord which will retract into a very small volume to permit its insertion in a relatively small appliance housing.

Therefore, it is the object of the invention to provide a retractile cord which in the retracted state occupies a very small volume.

A further object of the invention is to provide a retractile cord wherein a cord convolution is nested within another cord convolution.

A still further object of the present invention is to provide a retractile cord having a repeating configuration wherein the cord convolutions are nested in overlapping relationship so that the cord occupies a relatively small volume when in the retracted state.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which;

FIG. 1 is a side elevational view of a cord in the retracted state;

FIG. 2 is a side elevational view of the cord in a partially extended state; and FIG. 3 is a schematic cross sectional view of the cord in the retracted position.

Briefly, the present invention discloses a retractile cord having a flexible conductor with a resilient insulating jacket therearound to form cordage which has a plurality of repeating cycles wherein the cordage includes a longitudinally advancing outer convolution which spirals inwardly to an inner convolution which is nested beneath said outer convolution and the inner convolution advances longitudinally in the same direction and subsequently spirals outwardly in overlapping relationship.

Referring now to the drawings in which like reference numerals designate like parts throughout the several views, a retractile cord is generally designated by the reference numeral 10. It should be noted that the cord is not illustrated with standard plug ends since they do not form a part of this invention. As portrayed in FIG. 1, the cord 10 in the retracted state has outer convolutions thereof spaced relatively close together. The inner convolutions which are nested therebeneath cannot be seen in this figure. However, when the cord is partially extended as illustrated in FIG. 2, the intermediate and inner convolutions may be easily seen.

Preferably, the cord 10 consists of a resilient insulating jacket 11 which surrounds imbedded conductors 12 which are very pliable and may be of a spirally coil construction. The jacket 11 may be of vulcanized rubber or a suitable vinyl plastic. In any case, the jacket 11 is of the type commonly used in retractile cords wherein once the cord has been wound in a predetermined manner and is subjected to a heat treating process, the cord has a so-called memory which tends to bias it to the position it assumed while being set during heat treatment. In this manner the retractile cord will tend to return to the retracted state or position after it has been extended and then released. The subject cord is manufactured by known techniques employed by those skilled in the art and consequently is not discussed in detail here. However, the cordage is wound on an appropriate mandrel, subjected to the appropriate heat treatment which is governed in part by the characteristics of the jacket material and then unwound from the mandrel in the reverse direction.

According to the present invention, the cord 10 assumes the position illustrated in FIG. 3 in the retracted position. In this figure, the cord is illustrated schematically in order to clearly and accurately show the retracted position. The outer convolution of cord 10 at point 21 follows a circular path and constitutes an outer convolution which passes through point 22 at the bottom of the outer convolution and continues upwardly in the same circular path through point 23 at the top. It should be noted that the cord in passing through points 21, 22 and 23 is advancing longitudinally with respect to the horizontal or longitudinal axis of the cord 10. From point 23 the outer convolution spirals inwardly and passes through points 24 at the bottom and 25 at the top, which have a smaller radius than does the outer convolution at points 21, 22, and 23. Thus, the outer convolution of the cord 10 spirals inwardly to an intermediate convolution which is nested immediately beneath the outer convolution. Continuing further, the cord spirals inwardly past point 26 at the bottom and then on to point 27 at the top where it advances longitudinally in the same direction as the outer convolution as it continues through points 28 and 29. It can be appreciated that the cord in passing through points 26, 27, 28 and 29 is forming the first inner convolutions of a three layer cord assembly. And similarly, that portion of the cord passing through points 24 and 25 constitutes the first intermediate convolution while the portion of cord passing through points 21, 22 and 23 represents the first outer convolution. After passing point 29, the cord spirals outwardly past points 30 and 31 which constitute another or second intermediate convolution which is positioned alongside the previous or first intermediate convolution which passes through points 24 and 25. Whereupon the cord continues spiralling outwardly and rearwardly through point 32 which is positioned to the rear of points 30 and 31 and the cord continues in a circular path through points 32, 33 and 34 as it advances longitudinally forward to form further outer convolutions. When the cord reaches point 33 it has completed a full cycle in the cord design and subsequently follows a similar repeating pattern.

In this manner the cord 10 has a plurality of repeating coiled cycles which are continuous and spaced adjacent to one another along the longitudinal axis to define a relatively solid tubular mass. The next or second adjacent cycle begins by the cord passing through reference point 33 and circling around through points 34 and 35 to form an outer convolution and subsequently spirals inwardly through points 36 and 37 to form an intermediate convolution. Similarly, the cord passes through reference points 38, 39, 40 and 41 to form inner convolutions which advance longitudinally. As previously discussed, the cord spirals outwardly through reference points 42 and 43 to form an intermediate convolution which overlaps the inner convolution and continues outwardly through reference points 44, 45 and 46 which constitutes an outer convolution. The schematic sketch in FIG. 3 illustrates approximately three cycles of a repeating pattern. The third full cycle of the cord passes through points 45 through 56 in the same manner as hereinbefore discussed concerning the first two repeating cycles.

When a longitudinally acting force is applied to the ends of the cordage, it expands as shown in FIG. 2. Upon the removal of the force, the cord due to the resilient character of the outer jacket 11 biases the cordage back toward the retracted state as illustrated in FIG. 1. With the construction herein stated, the cord assembly assumes a very small volume when retracted with the inner and intermediate convolutions nested beneath the outer convolutions. In such construction a relatively long cord can be stored within a relatively small volume.

While the drawings have illustrated a basically three layer construction for the retractile cord, the same pattern may be used for cord sets having more than three layers. The same basic principle would be applied by having an outer convolution of cord spiral inwardly through intermediate convolutions of cord which would be nested beneath the outer convolution and continued to an inner convolution which would longitudinally advance ad subsequetly spiral outwardly to an adjacent outer convolution. In addition, the outer convolution would contain an extra half turn of cord which would fill in the space from the previous outer convolution before again advancing in order that the row of outer convolutions be closely spaced. That is to say in the retracted state the cord has outer convolutions positioned with their sides adjacent to one another presenting an outer layer of substantially solid convolutions.

While there has been illustrated and described in the particular embodiment of the retractile cord, it will be well understood that various changes and modifications may occur to those skilled in the art. It is intended in the appended claims to cover all such changes and modifications which fall within the true spirit and scope of the present invention.

What is claimed as new and desired to be secured by Letters Patent of the United States is:

1. A retractile coiled cord comprising a plurality of flexible conductors, a resilient insulating jacket enclosing said conductor to form cordage therewith, said cordage having a plurality of repeating coiled cycles which extend longitudinally in tubular cross section, a cycle of cordage including a first outer large convolution which spirals inwardly to an inner small convolution which advances longitudinally approximately the width of said cordage and then spirals outwardly in overlapping relationship to a second outer large convolution, said second large outer convolution contains approximately an additional half convolution every full cycle so that repeated cycles of cordage have a relatively continuous outer surface.

2. A retractile coiled cord comprising a flexible conductor, a resilient insulating jacket enclosing said conductor to form cordage therewith, said cordage including a plurality of repeating cycles, a cycle of cordage in the retracted position including a longitudinally advancing outer first convolution which spirals inwardly to define a first row of intermediate convolutions in overlapping nested relationship and progressing to an inner convolution which advaces longitudinally a distance approximately equal to the width of the cross section of said cord, said inner convolution spiralling outwardly to define a second row of intermediate convolutions in overlapping nested relationship which abut against said first row of intermediate convolutions, said second intermediate convolutions progressing to a second outer convolution, said second outer convolution retreats to abut against said first outer convolution and then advances longitudinally to start another cycle whereby the outer surface of cord is relatively continuous.

References Cited

UNITED STATES PATENTS

| 2,060,913 | 11/1936 | Weaver | 174—69 |
| 2,468,773 | 5/1949 | Musinski | 174—69 |

FOREIGN PATENTS

| 351,646 | 4/1922 | Germany. |

DARRELL L. CLAY, *Primary Examiner.*

L. H. MYERS, *Examiner.*